(12) United States Patent
Park et al.

(10) Patent No.: US 9,910,319 B2
(45) Date of Patent: Mar. 6, 2018

(54) METHOD OF MANUFACTURING CURVED LIQUID CRYSTAL DISPLAY PANEL AND APPARATUS FOR MANUFACTURING CURVED LIQUID CRYSTAL DISPLAY PANEL

(71) Applicant: SAMSUNG DISPLAY CO., LTD., Yongin, Gyeonggi-do (KR)

(72) Inventors: Seunghyun Park, Seoul (KR); Hyangyul Kim, Hwaseong-si (KR); Junho Song, Seongnam-si (KR); Jeanho Song, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 102 days.

(21) Appl. No.: 14/706,727

(22) Filed: May 7, 2015

(65) Prior Publication Data

US 2016/0062186 A1    Mar. 3, 2016

(30) Foreign Application Priority Data

Sep. 3, 2014 (KR) .................. 10-2014-0117204

(51) Int. Cl.
 *G02F 1/1337* (2006.01)
 *G02F 1/13* (2006.01)
 *G02F 1/1333* (2006.01)

(52) U.S. Cl.
 CPC ...... *G02F 1/133788* (2013.01); *G02F 1/1303* (2013.01); *G02F 1/1333* (2013.01); *G02F 1/133784* (2013.01); *G02F 1/133711* (2013.01)

(58) Field of Classification Search
 CPC ... G02F 2001/133757; G02F 1/133788; G02F 1/1333; G02F 1/133784; G02F 1/1303; G02F 1/133711
 See application file for complete search history.

(56) References Cited

U.S. PATENT DOCUMENTS

| | | | | |
|---|---|---|---|---|
| 5,824,377 A | * | 10/1998 | Pirwitz | C08G 77/382 349/123 |
| 8,404,571 B2 | * | 3/2013 | Hashimoto | C23C 16/303 117/106 |
| 2011/0299025 A1 | * | 12/2011 | Sahouani | A61F 9/067 349/194 |
| 2012/0249940 A1 | * | 10/2012 | Choi | G02F 1/133753 349/123 |
| 2013/0101755 A1 | * | 4/2013 | Lee | G02F 1/133707 428/1.23 |

FOREIGN PATENT DOCUMENTS

| | | |
|---|---|---|
| JP | 2005-166742 | 6/2005 |
| JP | 2008-242147 | 10/2008 |
| JP | 2010-010440 | 1/2010 |
| JP | 2011-085740 | 4/2011 |
| KR | 1020090069323 | 6/2009 |

* cited by examiner

*Primary Examiner* — Tracie Y Green

(74) *Attorney, Agent, or Firm* — F. Chau & Associates, LLC

(57) ABSTRACT

A method for manufacturing a curved liquid crystal display panel includes bending a display member including at least one alignment layer at a predetermined curvature using a jig and forming an alignment axis in the alignment layer while the display member is bent using an alignment axis forming part. A control part is used to control an operation of the jig and the alignment axis forming part.

17 Claims, 17 Drawing Sheets

METHOD OF MANUFACTURING CURVED LIQUID CRYSTAL DISPLAY PANEL AND APPARATUS FOR MANUFACTURING CURVED LIQUID CRYSTAL DISPLAY PANEL

CROSS-REFERENCE TO RELATED APPLICATION

This patent application claims priority under 35 U.S.C. § 119 to Korean Patent Application No. 10-2014-0117204, filed on Sep. 3, 2014, the contents of which are hereby incorporated by reference in its entirety.

TECHNICAL FIELD

The present disclosure relates to a curved liquid crystal display panel, and more particularly, to a method of manufacturing a curved liquid crystal display panel and an apparatus used for manufacturing the curved liquid crystal display panel

DISCUSSION OF THE RELATED ART

A flat panel display device is used to display an image in various information processing devices, such as a television set, a computer monitor, a notebook computer, a mobile phone, etc. In recent years, a curved display device having a curved display surface has been developed. The curved display device provides a user with a greater sense of three-dimensionality, immersion (or immersiveness), and presence.

The curved display device may be formed from a liquid crystal display device. The curved liquid crystal display device includes a curved liquid crystal display panel, a backlight unit, and a polarizer. The curved liquid crystal display panel has different characteristics depending on an alignment mode of liquid crystal.

SUMMARY

The present disclosure provides a method of manufacturing a curved liquid crystal display panel in which an alignment axis and an optical axis of a polarizer are substantially parallel to each other.

The present disclosure provides an apparatus for manufacturing the curved liquid crystal display panel.

Exemplary embodiments of the present inventive concept provide a method of manufacturing a curved liquid crystal display panel. The method includes bending a first display substrate, including a first alignment layer, at a predetermined curvature and forming a first alignment axis in the first alignment layer while the display substrate remains bent.

The first alignment layer includes a photo-reactive polymer. The forming of the first alignment axis includes irradiating the first alignment layer with light polarized in a predetermined direction.

The first alignment layer includes a polymer in which an energy between a liquid crystal director and a surface of the first alignment layer is larger than an energy between the liquid crystal director and air. The forming of the first alignment axis includes rubbing the first alignment layer in a predetermined direction.

The first display substrate includes a plurality of pixels. Each of the plurality of pixels includes a pixel electrode and a common electrode that together form a fringe electric field or a horizontal electric field.

The method may further include bending a second display substrate, including a second alignment layer, at the predetermined curvature and forming a second alignment axis substantially parallel to the first alignment axis in the second alignment layer, while the second display substrate is bent.

The second alignment layer may include the same material as the first alignment layer and the second alignment axis may be formed through the same process as the first alignment axis.

The method may further include coupling the first display substrate and the second display substrate so that the first alignment layer faces the second alignment layer.

The method may further include dropping a liquid crystal composition on one of the first and second alignment layers before the first display substrate is coupled to the second display substrate.

The method may further include injecting liquid crystal between the first and second alignment layers after the first display substrate is coupled to the second display substrate.

Exemplary embodiments of the present inventive concept provide a method of manufacturing a curved liquid crystal display panel. The method includes bending a display panel to a predetermined curvature. The display panel includes a first display substrate including a first alignment layer and a second display substrate including a second alignment layer. The second display substrate is spaced apart from the first display substrate. The display panel is irradiated with light, polarized in a predetermined direction, to form a first alignment axis in the first alignment layer and a second alignment axis in the second alignment layer. The first and second alignment layers each include a photo-reactive polymer.

The first display substrate may be irradiated with the polarized light while the display panel is irradiated.

The first display substrate may further include a polarizer to convert light incident thereupon to the polarized light.

The method may further include forming a liquid crystal layer between the first alignment layer and the second alignment layer.

Exemplary embodiments of the present inventive concept provide an apparatus for manufacturing a curved liquid crystal display panel. The apparatus includes a jig that bends a display member, including at least one alignment layer, at a predetermined curvature. An alignment axis forming part forms an alignment axis in the alignment layer while it is bent at the predetermined curvature. A control part controls an operation of the jig and the alignment axis forming part.

The alignment axis forming part may include a light emitting device that generates a source light and a polarizer that polarizes the source light, supplies the polarized source light to the alignment layer while the alignment layer is bent at the predetermined curvature.

The alignment axis forming part may further include a diffusion member to diffuse the source light and supply the diffused source light to the polarizer.

The alignment axis forming part may include a roller to rub the alignment layer.

According to the above, the alignment axis, which is formed while the alignment layer is bent, maintains its directivity when the alignment layer is restored to an unbent state. Accordingly, the alignment axis is not deformed. The alignment axis has substantially the same directivity as the transmission axis of the polarizer coupled to the curved liquid crystal display panel. Thus, light leakage of the curved liquid crystal display panel is reduced.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout the figures and disclosure.

It will be understood that, although the terms first, second, etc. may be used herein to describe various elements, components, regions, layers and/or sections, these elements, components, regions, layers and/or sections should not be limited by these terms. Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, exemplary embodiments of the present invention will be explained in detail with reference to the accompanying drawings.

Figure 1:
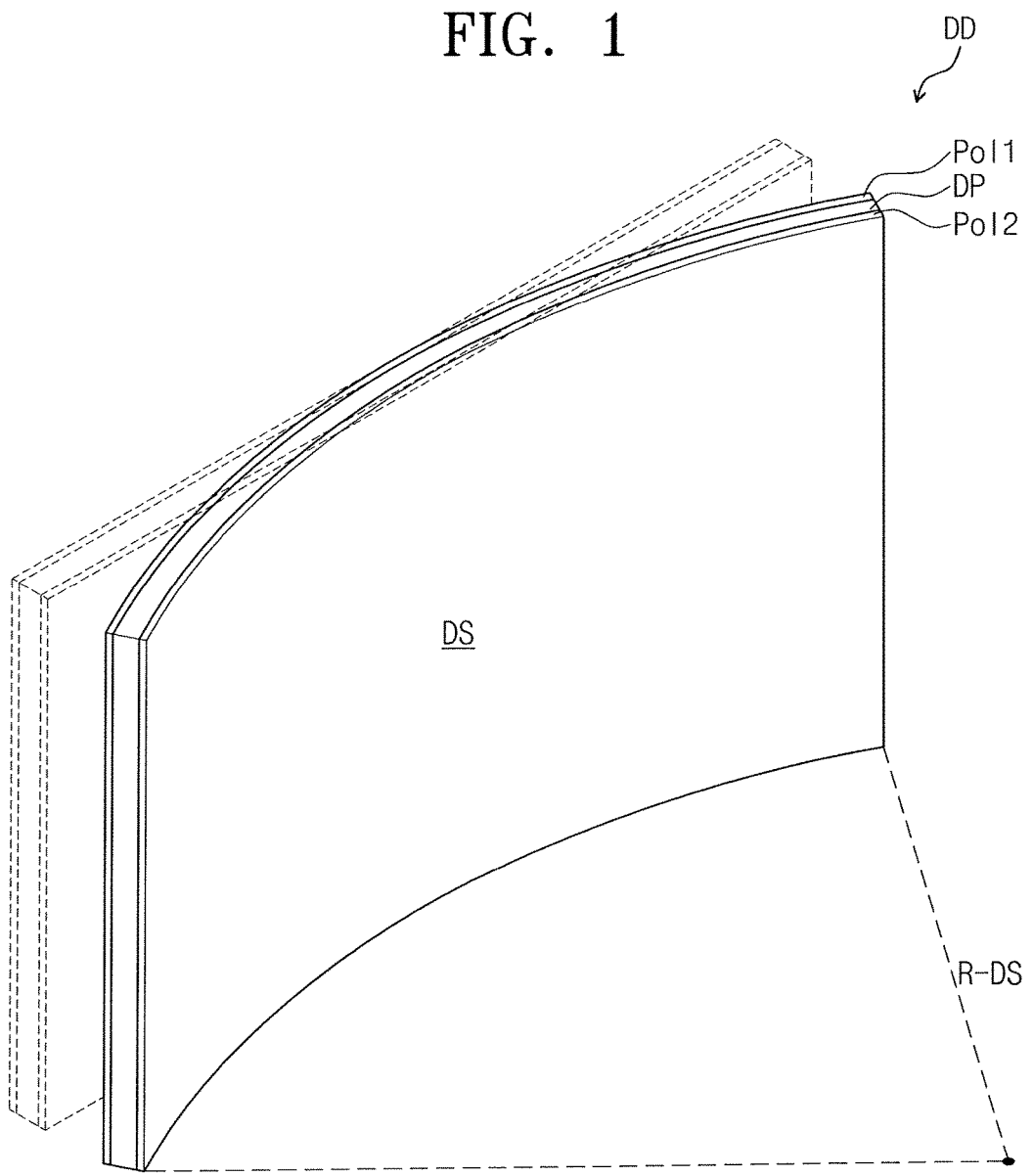
FIG. 1 is a perspective view showing a curved liquid crystal display device according to an exemplary embodiment of the present disclosure.
Figure 1:
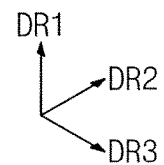
Figure 2:
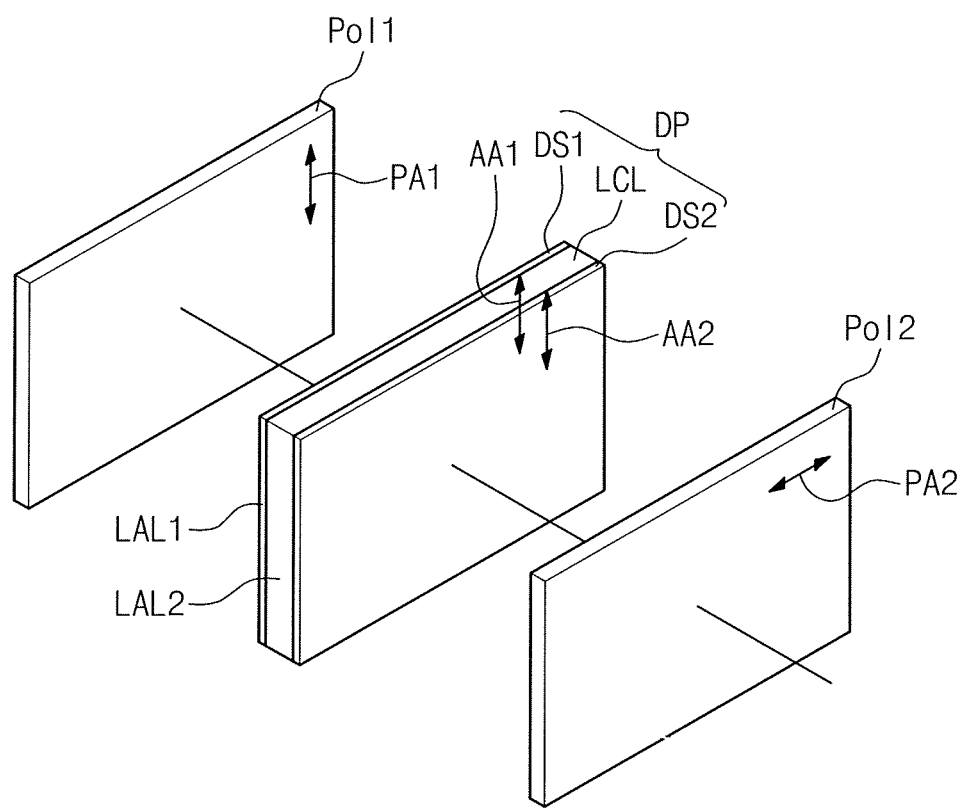
FIG. 2 is an exploded perspective view showing a curved liquid crystal display panel according to an exemplary embodiment of the present disclosure.
Figure 2:
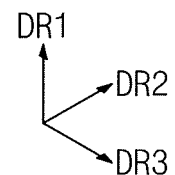

FIG. 1 is a perspective view showing a curved liquid crystal display device DD according to an exemplary embodiment of the present disclosure and FIG. 2 is an exploded perspective view showing a curved liquid crystal display panel according to an exemplary embodiment of the present disclosure.

Referring to FIGS. 1 and 2, the curved liquid crystal display device DD (hereinafter, referred to as a display device) includes a liquid crystal display panel DP (hereinafter, referred to as a display panel), a first polarizer Pol1, and a second polarizer Pol2 facing the first polarizer Pol1 such that the display panel DP is disposed between the first and second polarizers Pol1 and Pol2. Although not shown in figures, the display device DD further includes a backlight unit to supply light to the display panel DP. The display device DD further includes a frame to fix and/or couple the display panel DP, the first polarizer Pol1, the second polarizer Pol2, and the backlight unit to each other.

As shown in FIG. 1, the display device DD is curved at a predetermined curvature and a predetermined radius of curvature R-DS (hereinafter, referred to as a radius curvature). The display panel DP, the first polarizer Pol1, and the second polarizer Pol2 are fixed to and/or coupled to the frame after being curved at the predetermined curvature. The frame is formed of a metal or plastic material. The frame absorbs a restorative force of the display panel DP, the first polarizer Pol1, and the second polarizer Pol2 so that they may remain bent. Accordingly, the curvature of the display device DD is maintained by the frame.

The display panel DP includes a curved display surface DS. The radius curvature R-DS is measured from the display surface DS. The display surface DS, which is flat and not curved, is defined by a first direction DR1 and a second direction DR2, and a thickness direction of the display panel DP is referred to as a third direction DR3. In FIG. 1, the first direction DR1 corresponds to a vertical direction and the second direction DR2 corresponds to a horizontal direction.

Referring to FIG. 2, the display panel DP includes a first display substrate DS1, a second display substrate DS2, and a liquid crystal layer LCL interposed between the first display substrate DS1 and the second display substrate DS2. The first display substrate DS1 includes a first alignment layer LAL1 and the second display substrate DS2 includes a second alignment layer LAL2. The first alignment layer LAL1 has a first alignment axis AA1 and the second alignment layer LAL2 has a second alignment axis AA2 substantially in parallel to the first alignment axis AA1. The liquid crystal layer LCL includes liquid crystal molecules aligned in a horizontal direction between the first and second alignment axes AA1 and AA2.

Figure 3:
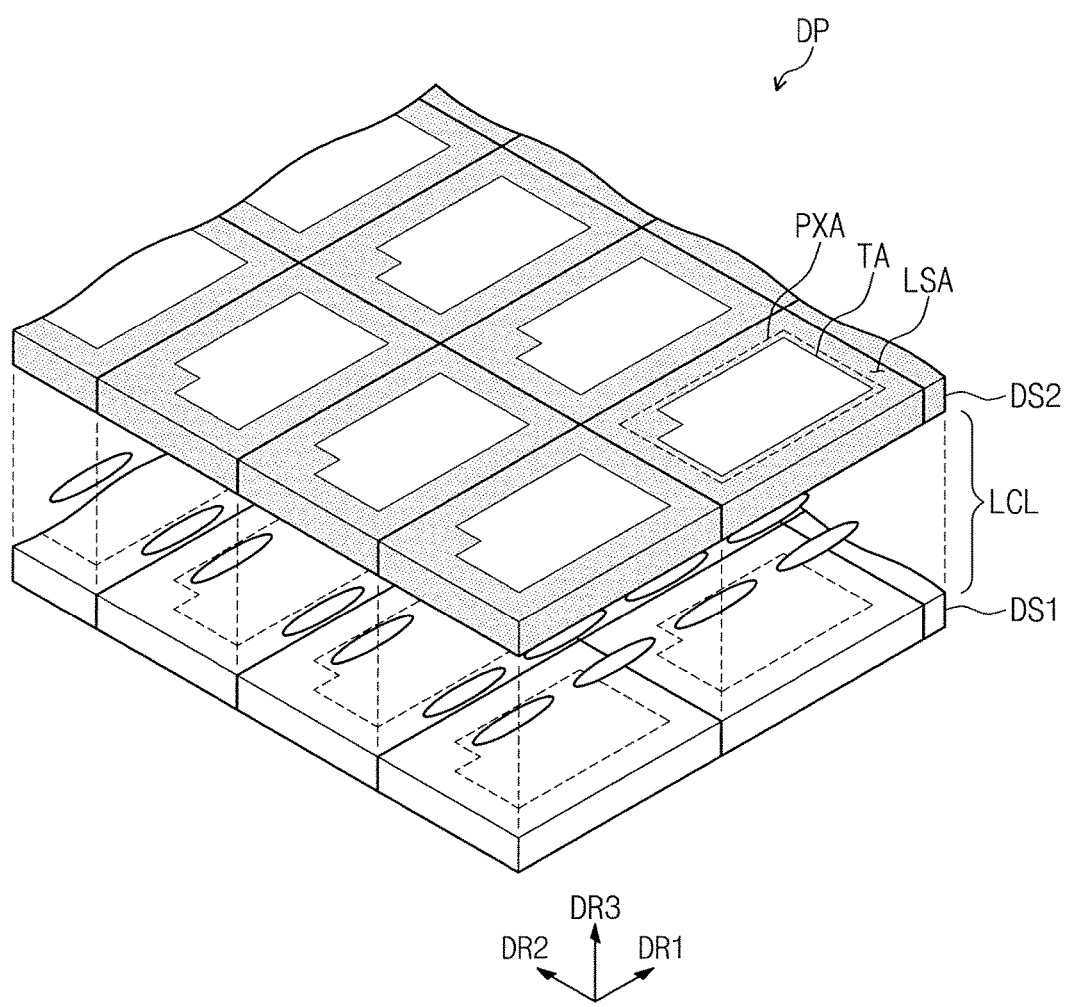
FIG. 3 is a partially enlarged view showing a curved liquid crystal display panel according to an exemplary embodiment of the present disclosure.
Figure 4:
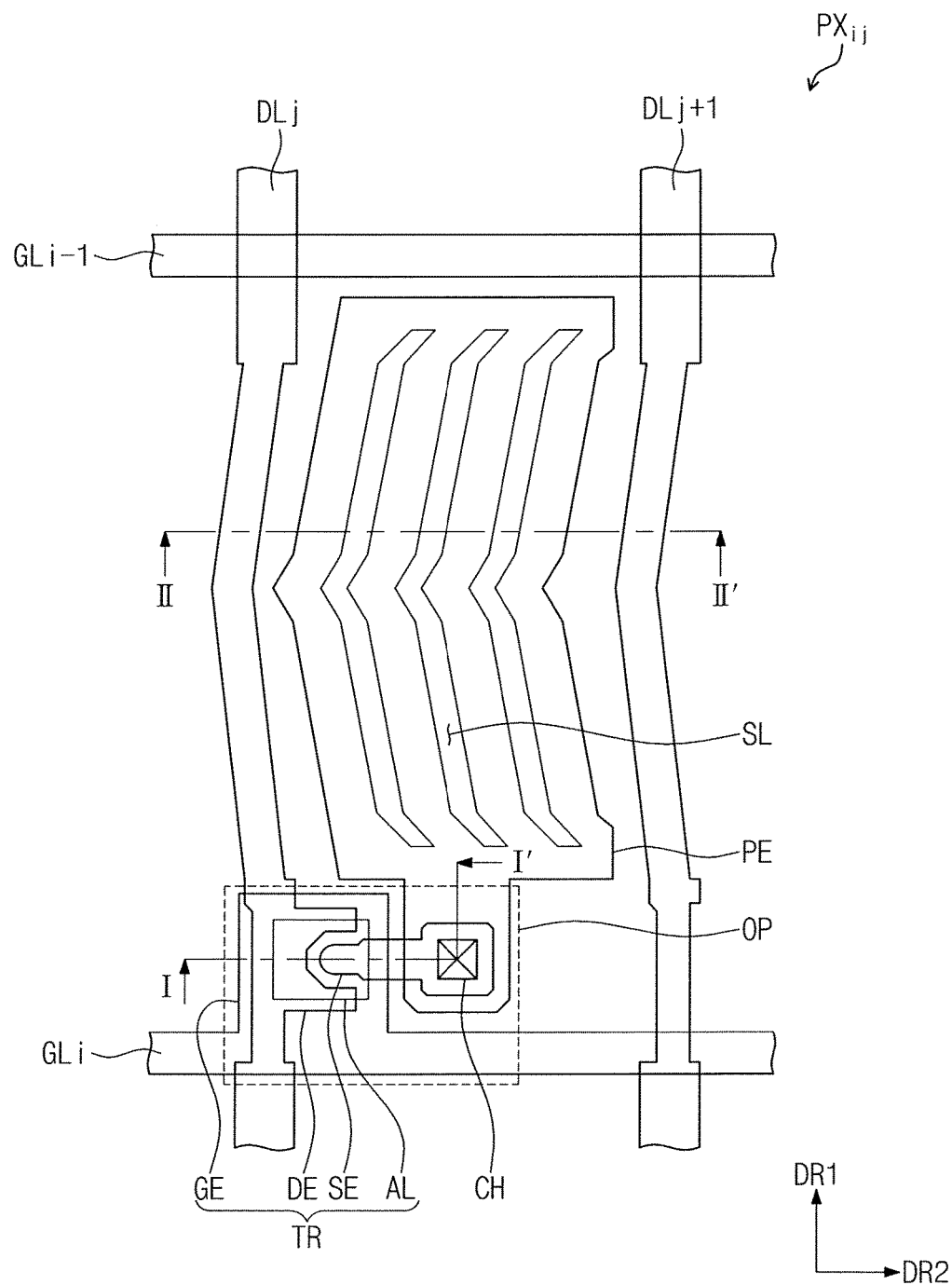
FIG. 4 is a plan view showing a pixel according to an exemplary embodiment of the present disclosure.
Figure 5:
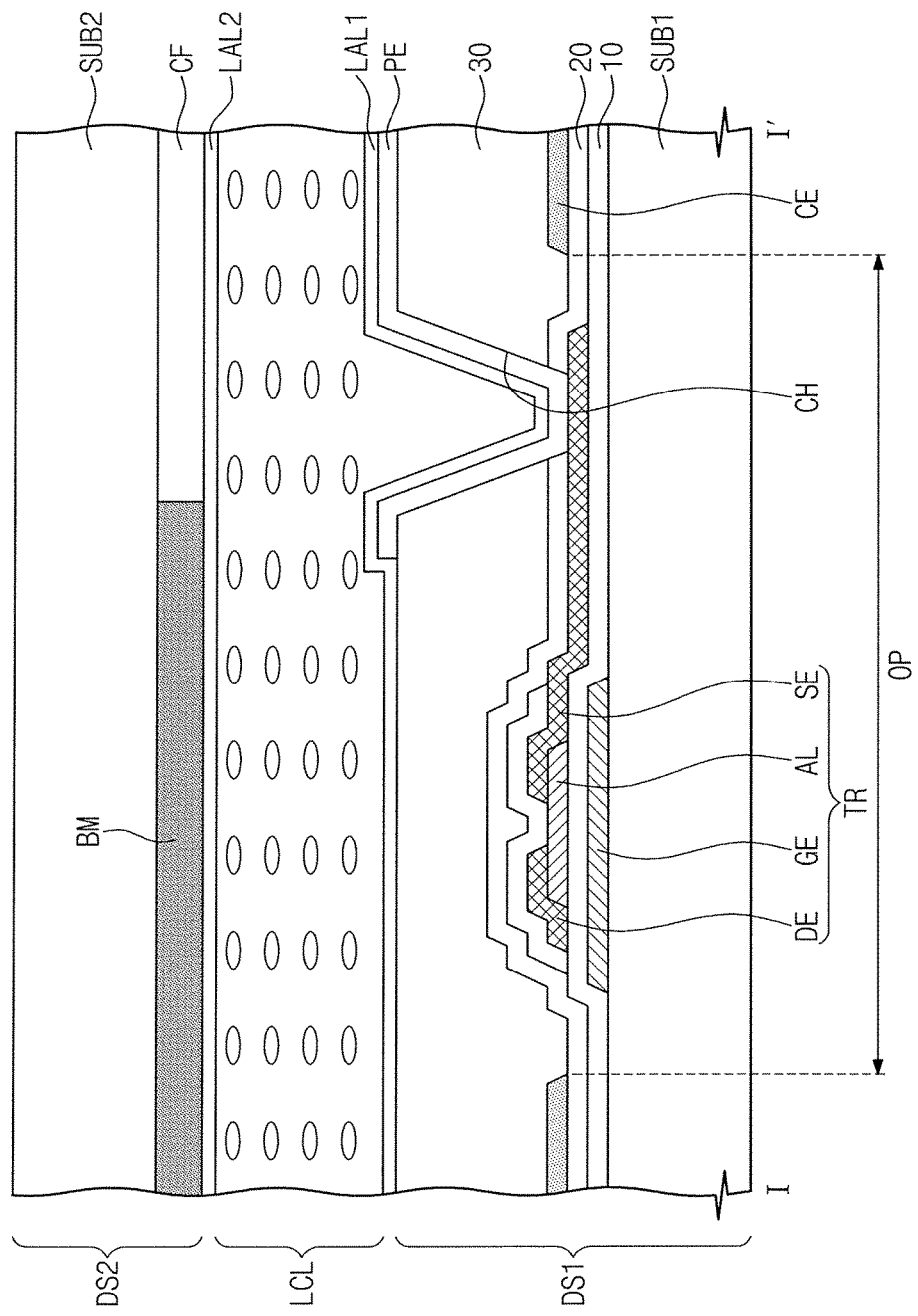
FIG. 5 is a cross-sectional view taken along a line I-I' of FIG. 4.
Figure 6:
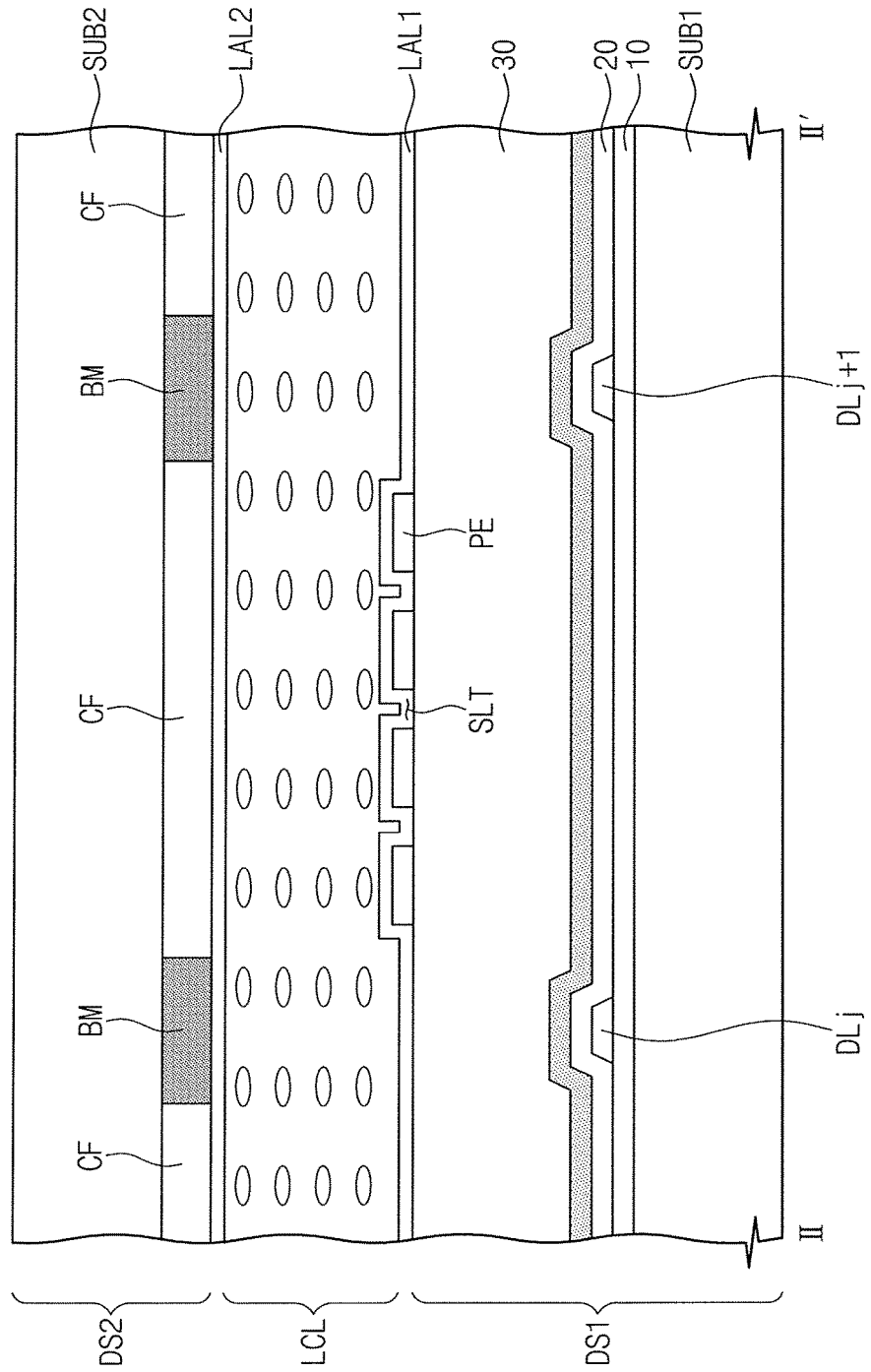
FIG. 6 is a cross-sectional view taken along a line II-IP of FIG. 4.

FIG. 3 is a partially enlarged view showing a curved liquid crystal display panel according to an exemplary embodiment of the present disclosure, FIG. 4 is a plan view showing a pixel according to an exemplary embodiment of the present disclosure, FIG. 5 is a cross-sectional view taken along a line I-I' of FIG. 4, and FIG. 6 is a cross-sectional view taken along a line II-IP of FIG. 4. Hereinafter, the display panel will be described in detail with reference to FIGS. 3 to 6.

Referring to FIG. 3, the first display substrate DS1 and the second display substrate DS2 are spaced apart from each other in the third direction DR3. The liquid crystal layer LCL is disposed between the first and second display substrates DS1 and DS2.

Although not shown in figures, the first display substrate DS1 includes a plurality of gate lines and a plurality of data lines crossing the gate lines. The data lines extend in the first direction DR1 and are arranged in the second direction DR2. The first display substrate DS1 includes a plurality of pixels each being connected to a corresponding gate line of the plurality of gate lines and a corresponding data line of the plurality of data lines.

The display panel DP includes display areas TA in which the image is displayed and a non-display area LSA disposed adjacent to the display areas TA. The display areas TA transmit the light generated by the backlight unit. The non-display area LSA blocks the light generated by the backlight unit. The non-display area LSA is overlapped with a black matrix included in the second display substrate DS2 and the display areas TA are overlapped with color filters included in the second display substrate DS2.

The pixels are arranged in pixel areas PXA, respectively. Each pixel area PXA has an area wider than that of a corresponding pixel of the plurality of pixels by an amount sufficient to accommodate a size of a thin film transistor TR as described later.

Hereinafter, a plane-to-switching (PLS) mode pixel PXij will be described in detail with reference to FIGS. 4 to 6.

The pixel PXij includes the thin film transistor TR, a pixel electrode PE connected to the thin film transistor TR, and a common electrode CE overlapped with the pixel electrode PE and provided with an opening OP formed therethrough. The common electrode CE is overlapped with plural pixel areas PXA (refer to FIG. 3). Accordingly, an outer boundary line of the common electrode CE is not shown in FIG. 4.

The thin film transistor TR includes a control electrode (or gate electrode) GE, an active layer AL, an input electrode (or drain electrode) DE, and an output electrode (or source electrode) SE. The control electrode GE is connected to an i-th gate line GLi and disposed on the same layer as the i-th gate line GLi. The input electrode DE is connected to a j-th data line DLj and disposed on the same layer as the j-th data line DLj. The control electrode GE, the input electrode DE, and the output electrode SE are partially overlapped with the active layer AL. The output electrode SE is connected to the pixel electrode PE through a contact hole CH. The pixel electrode PE includes a plurality of slits SLT formed therethrough. The number and the shape of the slits SLT should not be limited to a specific number and a specific shape. To form two domains, the slits SLT have a V shape extending primarily in the first direction DR1 as shown in FIG. 4.

Referring to FIGS. 5 and 6, the first display substrate DS1 includes a first base substrate SUB1, a plurality of insulating layers 10, 20, and 30 disposed on the first base substrate SUB1, and a plurality of conductive layers disposed on the first base substrate SUB1. The conductive layers form the thin film transistor TR, the pixel electrode PE, and the common electrode CE.

A portion of the conductive layers includes a metal material, such as silver (Ag), copper (Cu), molybdenum (Mo), chromium (Cr), tantalum (Ta), titanium (Ti), or an alloy thereof. The other portion of the conductive layers includes a transparent metal oxide, e.g., indium tin oxide. Each of the conductive layers has a single-layer structure or a multi-layer structure. A plurality of photolithography processes is performed on the conductive layers to form the thin film transistor TR, the pixel electrode PE, and the common electrode CE. In addition, a plurality of deposition or coating processes is performed to form the insulating layers 10, 20, and 30.

The first base substrate SUB1 is a transparent substrate, e.g., a plastic substrate, a glass substrate, etc. The control electrode GE is disposed on a surface of the first base substrate SUB1. Although not shown in figures, a barrier layer and/or a buffer layer may be further disposed on the surface of the first base substrate SUB1.

The first insulating layer 10 is disposed on the first base substrate SUB1 to cover the control electrode GE. The first insulating layer 10 includes at least one of a silicon nitride layer and a silicon oxide layer. The active layer AL is disposed on the first insulating layer 10. The active layer AL includes a semiconductor layer and an ohmic contact layer disposed on the semiconductor layer. The active layer AL includes amorphous silicon, crystalline silicon, or metal oxide semiconductor material.

The input electrode DE and the output electrode SE are disposed on the first insulating layer 10. The input electrode DE and the output electrode SE are spaced apart from each other. The input electrode DE and the output electrode SE overlap the active layer AL.

The second insulating layer 20 is disposed on the first insulating layer 10 to cover the input electrode DE and the output electrode SE. The second insulating layer 20 includes at least one of a silicon nitride layer and a silicon oxide layer.

The common electrode CE is disposed on the second insulating layer 20. The common electrode CE includes the opening OP formed therethrough to prevent the pixel electrode from being shorted with the common electrode CE. The third insulating layer 30 is disposed on the second insulating layer 20 to cover the common electrode CE. The third insulating layer 30 includes an organic material to provide a flat surface.

The pixel electrode PE is disposed on the third insulating layer 30. The pixel electrode PE is connected to the output electrode SE through the contact hole CH formed through the second and third insulating layers 20 and 30. The pixel electrode PE includes a transparent metal oxide. In the present exemplary embodiment, positions of the pixel electrode PE and the common electrode CE may be switched with each other.

The first alignment layer LAL1 is disposed on the third insulating layer 30 to cover the pixel electrode PE. The first alignment axis AA1 is defined in the first alignment layer LAL1. The first alignment axis AA1 is defined by a polarization direction of a polarized light irradiated to the first alignment layer LAL1 or a direction in which the first alignment layer LAL1 is rubbed by a roller.

The first alignment layer LAL1, in which the first alignment axis AA1 is defined by the polarization direction of the polarized light, includes a photo-reactive polymer. The photo-reactive polymer is a polymer in which a chemical structure thereof is varied by a light. The variation in the chemical structure includes composition of polymer chains, decomposition of polymer chains, and/or isomerization of polymer. When the first alignment layer LAL1 is irradiated by the polarized light, composition, decomposition, and isomerization reactions of the polymer chains occur in accordance with the polarization direction, and a pattern of the polymer in the polarization direction defines the alignment axis.

The first alignment layer LAL1, in which the first alignment axis AA1 is defined by the rubbing direction of the roller, includes a polymer having a specific energy to horizontally align the liquid crystal molecules. The first alignment layer LAL1 includes the polymer in which the energy between liquid crystal directors and a surface of the first alignment layer is higher than that between the liquid crystal directors and air. To horizontally align the liquid crystal molecules, the energy is obtained on the basis of van der Waals force between the surface of the first alignment layer LAL1 and the liquid crystal directors.

The second display substrate DS2 includes a second base substrate SUB2, the color filter CF disposed on the second base substrate SUB2, and the black matrix BM. In the present exemplary embodiment, at least one of the color filter CF and the black matrix BM may be disposed on the first base substrate SUB1.

The second alignment layer LAL2 is disposed on the second base substrate SUB2. The second alignment layer LAL2 is disposed on the color filter CF and the black matrix BM. The second alignment axis AA2, substantially in parallel to the first alignment axis AA1, is defined in the second alignment layer LAL2. The second alignment axis LAL2 is defined by a polarization direction of a polarized light used to irradiate the second alignment layer LAL2 or a direction in which the second alignment layer LAL2 is rubbed by a roller. The second alignment layer LAL2 has substantially the same composition as the first alignment layer LAL1 and the second alignment axis AA2 is defined in the same way as the first alignment axis AA1.

When a pixel voltage is applied to the pixel electrode PE, a fringe electric field is generated between the pixel electrode PE and the common electrode CE. Due to the fringe electric field, an alignment of the liquid crystal directors is changed. The light incident to and traveling through the liquid crystal layer LCL transmits through or is blocked by the liquid crystal layer LCL.

Figure 7:
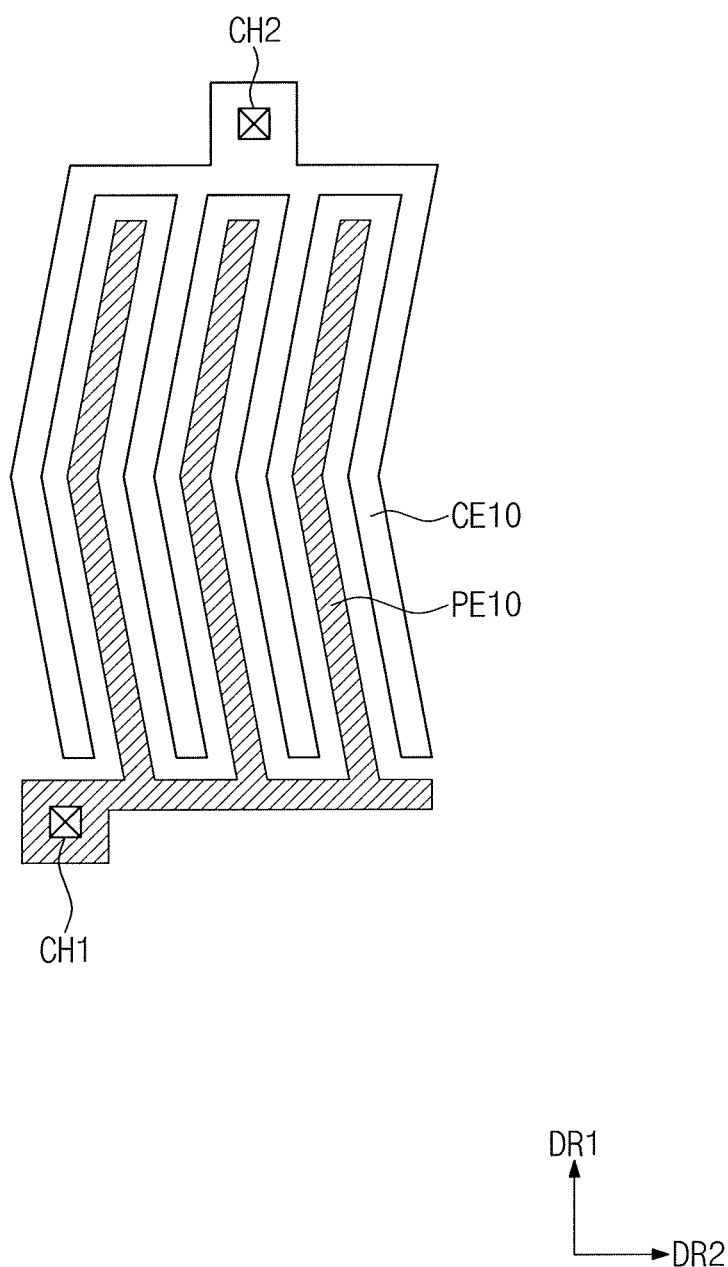
FIG. 7 is a plan view showing a portion of a pixel according to an exemplary embodiment of the present disclosure.

FIG. 7 is a plan view showing a portion of a pixel according to an exemplary embodiment of the present disclosure. FIG. 7 shows a pixel electrode PE10 and a common electrode CE10, which are included in an in-plane switching (IPS) mode pixel. The arrangement and the shape of the pixel electrode and the common electrode of the IPS mode pixel are different from those of the PLS mode pixel described above with reference to FIGS. 4 to 6.

Similar to the display panel described above with reference to FIGS. 4 to 6, the IPS mode display panel includes a first alignment layer LAL1 and a second alignment layer LAL2, which are respectively disposed on a first display substrate DS1 and a second display substrate DS2. The first alignment layer LAL1 has a first alignment axis AA1 and the second alignment layer LAL2 has a second alignment axis AA2 substantially parallel to the first alignment axis AA1. The liquid crystal layer LCL includes liquid crystal molecules aligned in a horizontal direction between the first alignment axis AA1 and the second alignment axis AA2.

In the IPS mode display panel, the pixel electrode PE10 and the common electrode CE10 are disposed on the same layer. For example, the pixel electrode PE10 and the common electrode CE10 may both be disposed on the third insulating layer 30 as shown in FIGS. 5 and 6. The pixel electrode PE10 is connected to the output electrode SE (refer to FIG. 5) through a first contact hole CH1 and the common electrode CE10 is connected to a common line (not shown) applied with a common voltage through a second contact hole CH2.

Each of the pixel electrode PE10 and the common electrode CE10 includes a plurality of branch portions. Each branch portion of the plurality of branch portions has a V shape extending in the first direction DR1. The branch portions of the pixel electrode PE10 are alternately arranged with the branch portions of the common electrode CE10. When the pixel voltage is applied to the pixel electrode PE10, a horizontal electric field is generated between the branch portions of the pixel electrode PE10 and the branch portions of the common electrode CE10. Due to the horizontal electric field, an alignment of the liquid crystal directors is changed. The light incident to and traveling through the liquid crystal layer LCL transmits through or is blocked by the liquid crystal layer LCL.

Referring to FIGS. 1 and 2, each of the first and second polarizers Pol1 and Pol2 may be formed by, after allowing iodine compound or dichroic polarizing material to be absorbed onto a polyvinyl alcohol-based polarizing film, drawing the polyvinyl alcohol-based polarizing film in along an elongation direction. Each of the first and second polarizers Pol1 and Pol2 may further include a triacetyl cellulose protective film to protect the iodine compound or the dichroic polarizing material. The optical axis, e.g., a transmission axis, of the first and second polarizers Pol1 and Pol2 is determined based on the elongation direction.

In addition, each of the first and second polarizers Pol1 and Pol2 may be, but is not limited to being, an optical member that includes a liquid crystal layer aligned in a specific direction and curved. The optical axis of the first and second polarizers Pol1 and Pol2 is determined according to the alignment direction of the liquid crystal layer.

In the present exemplary embodiment, the first and second polarizers Pol1 and Pol2 have a first transmission axis PA1 and a second transmission axis PA2, which are substantially perpendicular to each other. However, in a normally white mode liquid crystal display device, the first transmission axis PA1 and the second transmission axis PA2 are substantially parallel to each other.

In the present exemplary embodiment, the first transmission axis PA1, the first alignment axis AA1, and the second alignment axis AA2 are substantially parallel to the first direction DR1. The second transmission axis PA2 is substantially perpendicular to the first transmission axis PA1. When the first transmission axis PA1, the first alignment axis AA1, and the second alignment axis AA2 are substantially parallel to each other, a variation in phase of the light passing through the first transmission axis PA1, the first alignment axis AA1, and the second alignment axis AA2 does not occur. Accordingly, a black in which no light leakage exists is displayed in an inactivation period in which the liquid crystal layer LCL maintains an initial alignment state. Meanwhile, white color becomes brighter in the normally white mode. The light passing through the first transmission axis PA1, the first alignment axis AA1, and the second alignment axis AA2 does not transmit through the second transmission axis PA2 since the phase of the light is not varied while passing through the first transmission axis PA1, the first alignment axis AA1, and the second alignment axis AA2. Alternatively, the first and second alignment axes AA1 and AA2 may be substantially parallel to the second transmission axis PA2.

As shown in FIG. 1, when the first and second alignment axes AA1 and AA2 are not deformed, the light leakage does not occur even though the display panel DP is curved. According to a manufacturing method of the display panel, the first and second alignment axes AA1 and AA2 may be deformed. The deformation of the first and second alignment axes AA1 and AA2 may be caused by compression or tension of the first and second alignment layers LAL1 and LAL2.

Hereinafter, the manufacturing method of the display substrate and the display panel will be described. In addition, the same reference numerals may denote the same elements in FIGS. 1 to 7, and thus detailed descriptions of the same elements will be omitted.

According to an exemplary embodiment of the present invention, the first and second alignment axes AA1 and AA2 are not deformed during the manufacturing method of the display substrate and the display panel. When the display panel DP is curved after being fixed to the frame, the first and second alignment axes AA1 and AA2 may be substantially parallel to the first transmission axis PAI.

Figure 8:
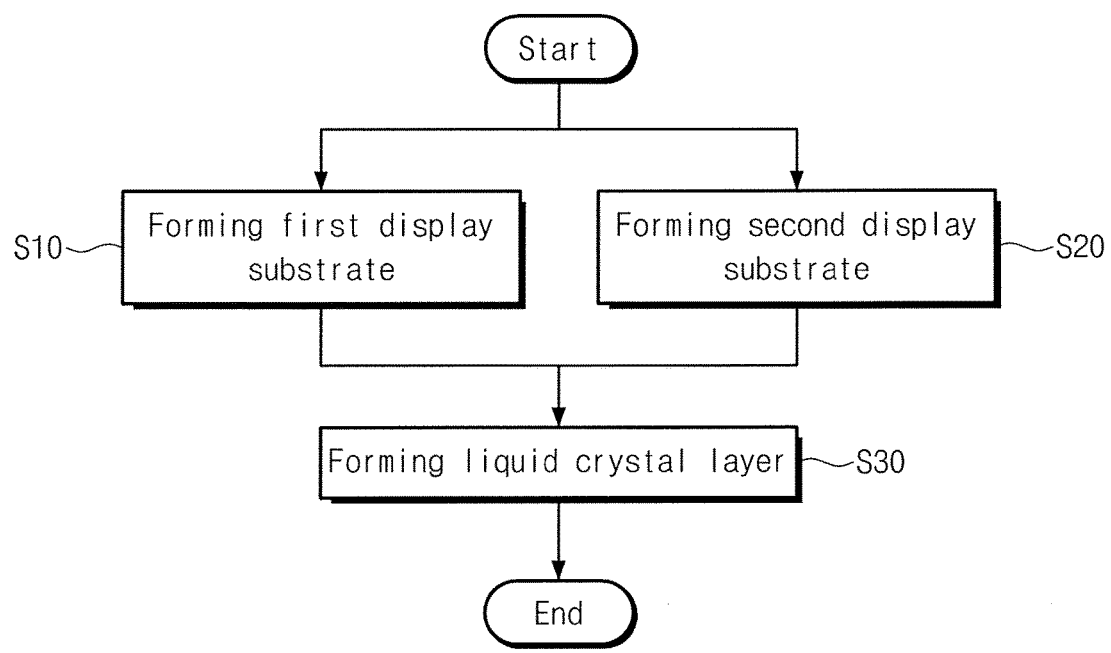
FIG. 8 is a flowchart showing a method of manufacturing a curved liquid crystal display panel according to an exemplary embodiment of the present disclosure.

FIG. 8 is a flowchart showing the manufacturing method of the curved liquid crystal display panel according to an exemplary embodiment of the present disclosure.

Referring to FIG. 8, the first display substrate DS1 is manufactured (S10). The first display substrate DS1 is manufactured by performing photolithography processes and deposition and coating processes. The second display substrate DS2 is manufactured (S20). The second display substrate DS2 may be manufactured at substantially the same time as the first display substrate DS1 is manufactured. Alternatively, the first and second display substrates DS1 and DS2 are sequentially manufactured. The order of manufacturing the first and second display substrates DS1 and DS2 should not be limited to a specific order.

Then, the liquid crystal layer LCL is formed (S30). In detail, the liquid crystal layer LCL is formed by disposing a liquid crystal composition onto either the first or second display substrates DS1 and DS2. For example, the liquid crystal composition may be applying to one of the first and second alignment layers LAL1 and LAL2. The first and second display substrates DS1 and DS2 may be coupled to each other and an edge of the first and second display substrates DS1 and DS2 may be sealed. Alternatively, the liquid crystal layer LCL is formed by coupling the first and second display substrates DS1 and DS2 to each other and injecting the liquid crystal composition in between the first and second display substrates DS1 and DS2.

Figure 9:
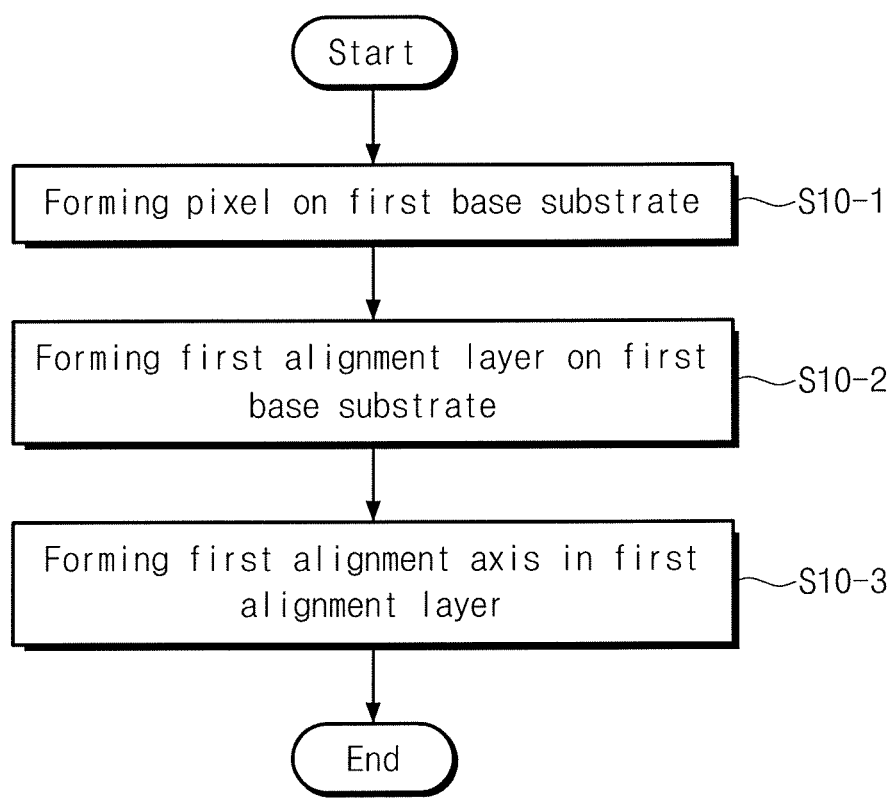
FIG. 9 is a flowchart showing a method of manufacturing a first display substrate according to an exemplary embodiment of the present disclosure.
Figure 10:
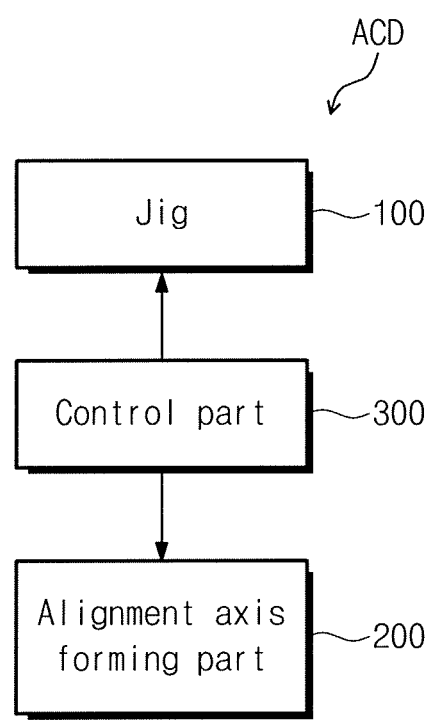
FIG. 10 is a block diagram showing an apparatus of manufacturing a curved liquid crystal display panel according to an exemplary embodiment of the present disclosure.
Figure 11:
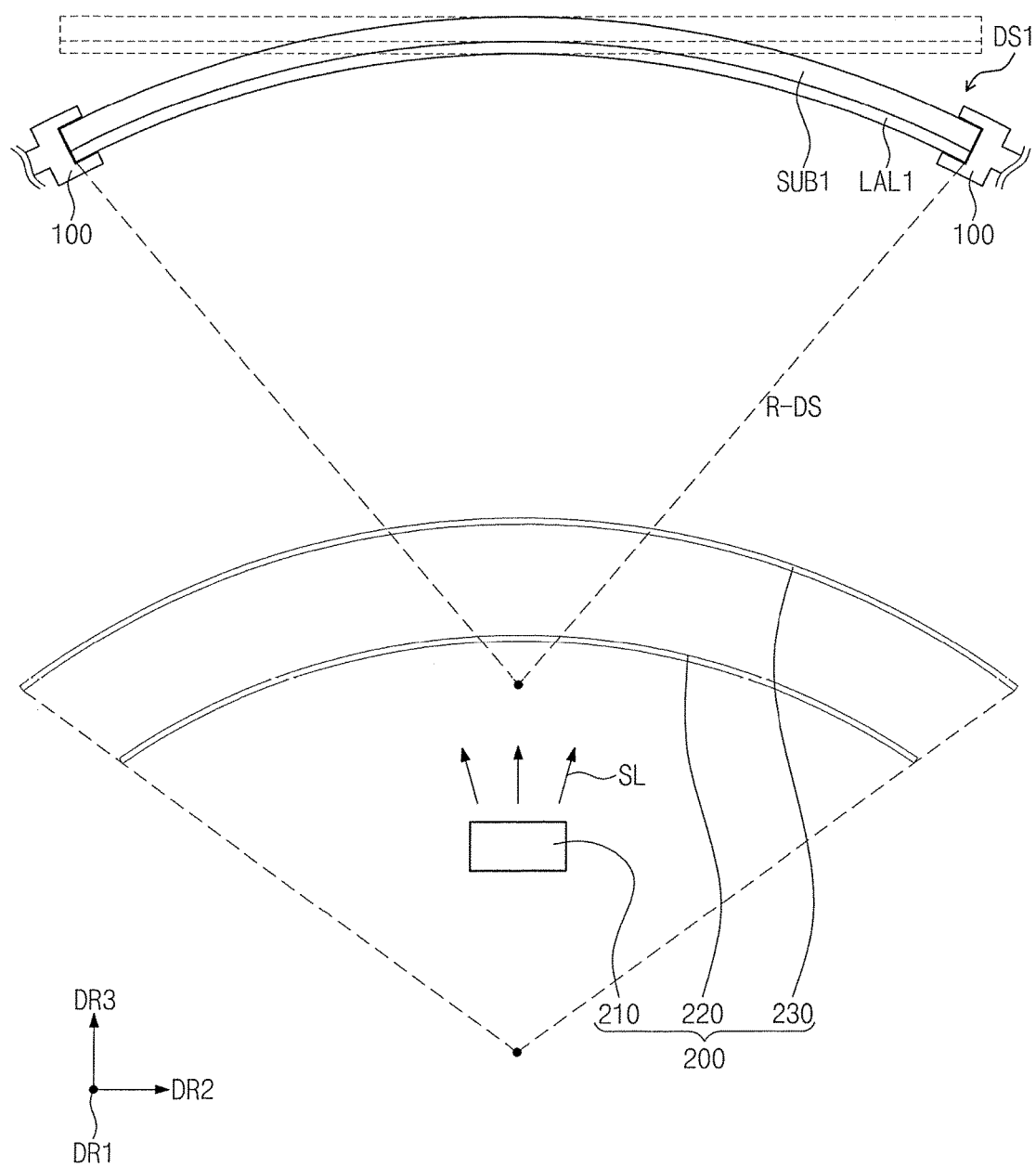
FIG. 11 is a plan view showing a method of forming a first alignment axis according to an exemplary embodiment of the present disclosure.

FIG. 9 is a flowchart showing a method of manufacturing the first display substrate DS1 according to an exemplary embodiment of the present disclosure, FIG. 10 is a block diagram showing an apparatus of manufacturing the curved liquid crystal display panel according to an exemplary embodiment of the present disclosure, and FIG. 11 is a plan view showing a method of forming the first alignment axis AA1 according to an exemplary embodiment of the present disclosure. Hereinafter, the manufacturing method of the first display substrate DS1 will be described in detail with reference to FIGS. 9 to 11.

Referring to FIG. 9, the pixel PXij is formed on the first base substrate SUB1 (S10-1). The signal lines GLi, GLi+1, DLj, and DLj+1, the thin film transistor TR, and the pixel electrode PE are formed on the first base substrate SUB1 through photolithography processes. The deposition or coating processes are performed to form the first, second, and third insulating layers 10, 20, and 30 while the photolithography processes are performed.

The first alignment layer LAL1 is formed on the first base substrate SUB1 (10-2). The first alignment layer LAL1 is formed by a slit coating process or a spin coating process. In this case, the first alignment layer LAL1 is a base layer in which the alignment axis is not defined.

The first alignment axis AA1 is formed in the first alignment layer LAL1 (S10-3). The first alignment axis AA1 is formed by a light irradiation process or a rubbing process. For example, the first alignment axis AA1 may be formed by using the apparatus shown in FIGS. 10 and 11.

Referring to FIG. 10, the apparatus ACD includes a jig 100, an alignment axis forming part 200, and a control part 300. A display member including at least one alignment layer is bent by the jig 100 at a predetermined curvature. The display member is configured to include the display substrate or the display panel. The alignment axis forming part 200 irradiates the alignment layer with the light or rubs the alignment layer to form the alignment axis.

The control part 300 controls an operation of both the jig 100 and the alignment axis forming part 200. The control part 300 controls a position of the jig 100 with respect to the display member, a holding intensity of the jig 100 with respect to the display member, and a displacement of the jig 100 to bend the display member. The control part 300 controls an amount of light and/or the speed of the rubbing motion.

Hereinafter, the method of forming the first alignment axis AA1 will be described in detail with reference to FIG. 11. FIG. 11 shows the alignment axis forming part 200 that forms the first alignment axis AA1 using the light. Other elements of the first display substrate DS1 are not shown in FIG. 11 except for the first alignment layer LAL1 and the first base substrate SUB1.

The alignment axis forming part 200 includes a light emitting device 210 to emit a source light SL, a diffusion member 220 to diffuse the source light SL, and a polarizer 230 to polarize the diffused source light SL. The source light SL may be ultraviolet light, visible light, or infrared light, but according to some exemplary embodiments of the present invention, ultraviolet light having a relatively high energy may be used as the source light SL. The polarizer 230 has a transmission axis PA1 extending in the first direction DR1 similar to the first polarizer Pol1 shown in FIG. 2. The polarizer 230 may be, but is not limited to being, the elongation polarization film as the first polarizer Pol1.

FIG. 11 shows the use of a single light emitting device 210, but the number of the light emitting devices should not be limited to one. According to some exemplary embodiments of the present invention, the diffusion member 220 may be omitted and additional light emitting devices 210 may be added. The polarizer 230 is also shown. The control part 300 is not shown in FIG. 11, but the control part 300 may include electronic equipment, e.g., a computer system, to control the jig 100 and the alignment axis forming part 200. In addition, the jig 100 may be a part of a robot arm.

As shown in FIG. 11, the first display substrate DS1 on which the first alignment layer LAL1 is formed is provided. The first display substrate DS1 is bent by the jig 100 at a predetermined curvature such that an inner surface of the first base substrate SUB1 has the radius of curvature smaller than that of an outer surface of the first base substrate SUB1. The inner surface corresponds to one surface of the first base substrate SUB1, on which the first alignment layer LAL1 is disposed. The curvature of the first display substrate DS1 is substantially the same as the curvature of the display panel DP shown in FIG. 1. A cell gap between the first display substrate DS1 and the second display substrate DS2 may be ignored since the cell gap may have a value substantially smaller than the radius of curvature R-DS shown in FIG. 1.

The alignment axis forming part 200 is disposed to face the inner surface of the first display substrate DS1. The alignment axis forming part 200 provides the polarized light to the first alignment layer LAL1 so that the first alignment layer LAL1 may be irradiated thereby. The first alignment axis AA1 is formed in the first alignment layer LAU. The first alignment axis AA1 is uniformly formed over the entirety of the first alignment layer LAU. The first alignment axis AA1 extends in the first direction DR1 as does the transmission axis of the polarizer 230.

The polarizer 230 is bent at the same curvature as that of the first display substrate DS1. The bent polarizer 230 provides the first alignment layer LAL1 with the polarized light at uniform intervals.

When the first display substrate DS1 is bent, a compressive stress is applied to the first alignment layer LAL1. The first alignment axis AA1 is defined in the first alignment layer LAL1 while the first alignment layer LAL1 is deformed. As shown in FIG. 1, since the first display substrate DS1 is coupled to the frame while being bent, the first alignment axis AA1 may be substantially parallel to the first transmission axis PA1 of the first polarizer Pol1 even though the first alignment layer LAL1 is deformed.

An alignment axis may be formed in an alignment layer after the alignment layer is formed on a display substrate in a flat state. In this case, the alignment axis is deformed when the display substrate is bent. This is because a compressive stress and a tensile stress are applied to the alignment layer while the display substrate is bent. The alignment layer applied with the compressive stress is compressed along the second direction and elongated along the first direction. Accordingly, the deformed alignment axis has multiple inflection points. The alignment layer applied with the tensile stress is elongated along the second direction and compressed along the first direction, and thus the deformation of the alignment layer is caused.

The deformed alignment axis causes light leakage when the display substrate is coupled to the frame. This is because the alignment axis is not parallel to the first transmission axis PA1.

According to some exemplary embodiments of the present invention, the alignment axis forming part 200 may be disposed to face the outer surface of the first display substrate DS1. The outer surface corresponds to a surface of the first base substrate SUB1 on which the first alignment layer LAL1 is not disposed. The polarizer 230, the diffusion member 220, and the light emitting device 210 are sequentially arranged in the third direction DR3 from the outer surface of the first display substrate DS1. The polarized light is provided to the first alignment layer LAL1 through the transmission area TA (refer to FIG. 3) of the first display substrate DS1.

Figure 12:
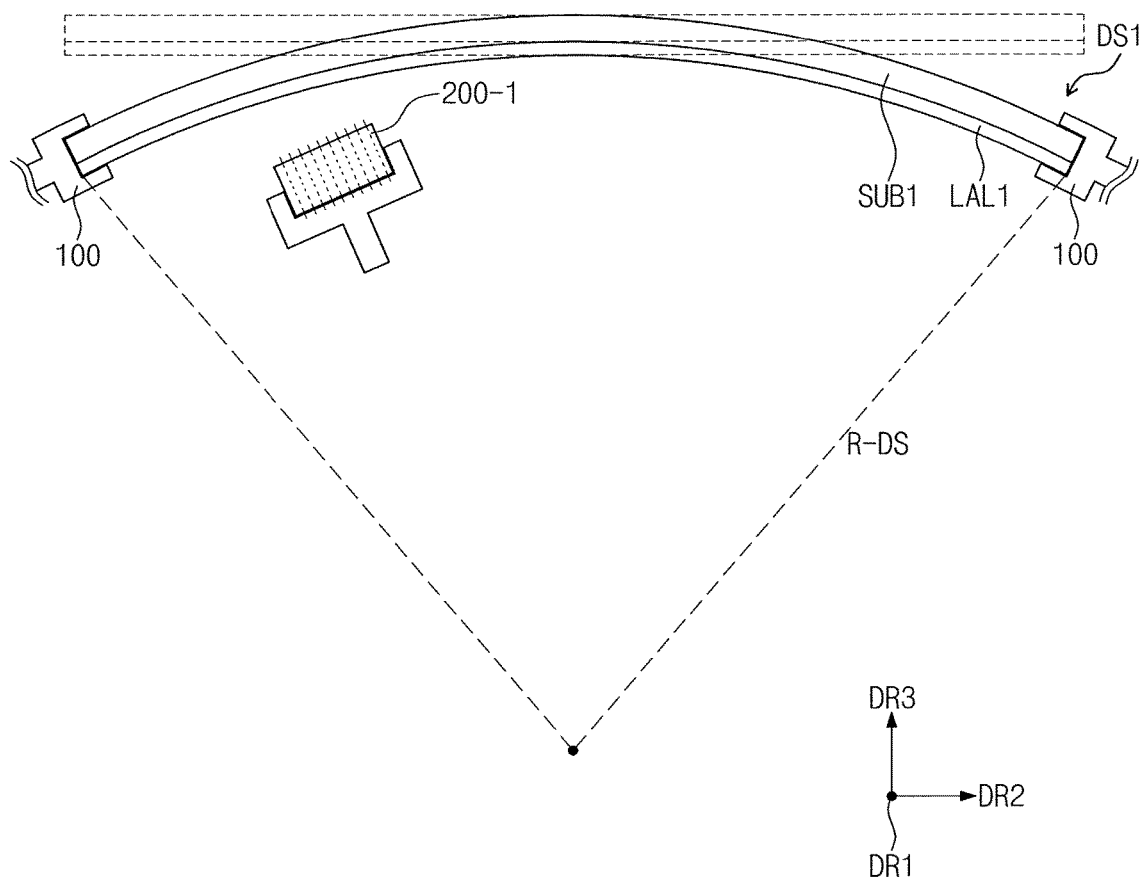
FIG. 12 is a plan view showing a method of forming a first alignment axis according to an exemplary embodiment of the present disclosure.

FIG. 12 is a plan view showing a method of forming a first alignment axis according to an exemplary embodiment of the present disclosure. In FIG. 12, detailed descriptions of the same elements as those described with reference to FIG. 11 may be omitted.

Referring to FIG. 12, an alignment axis forming part 200 includes a roller 200-1 that forms the alignment axis through the rubbing method. The roller 200-1 is connected to the robot arm. The roller 200-1 rotates to rub the first alignment layer LAL1. The roller 200-1 rubs the entire surface of the first alignment layer LAL1 along the first direction DR1. When the polymer chains of the first alignment layer LAL1 are aligned in a uniform direction due to the rubbing of the roller 200-1, the first alignment axis AA1 is formed.

The first alignment axis AA1 defined while the first alignment layer LAL1 is deformed may be substantially parallel to the first transmission axis PA1 since the first display substrate DS1 is coupled to the frame while being bent.

Figure 13:
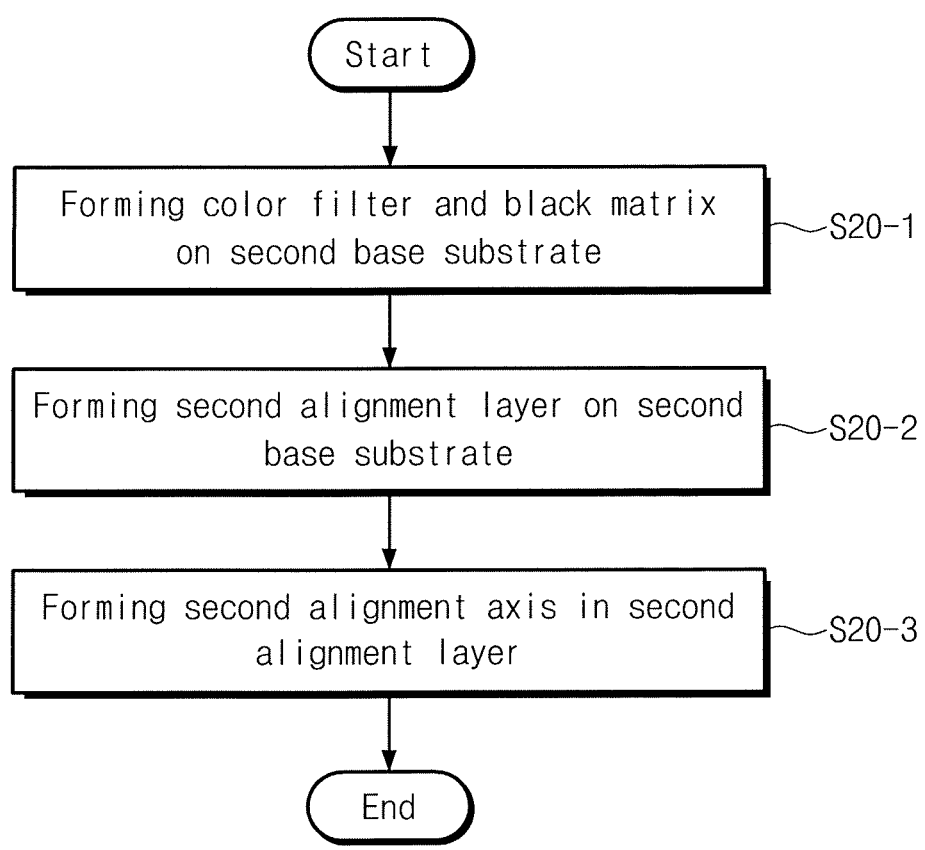
FIG. 13 is a flowchart showing a method of manufacturing a second display substrate according to an exemplary embodiment of the present disclosure.
Figure 14:
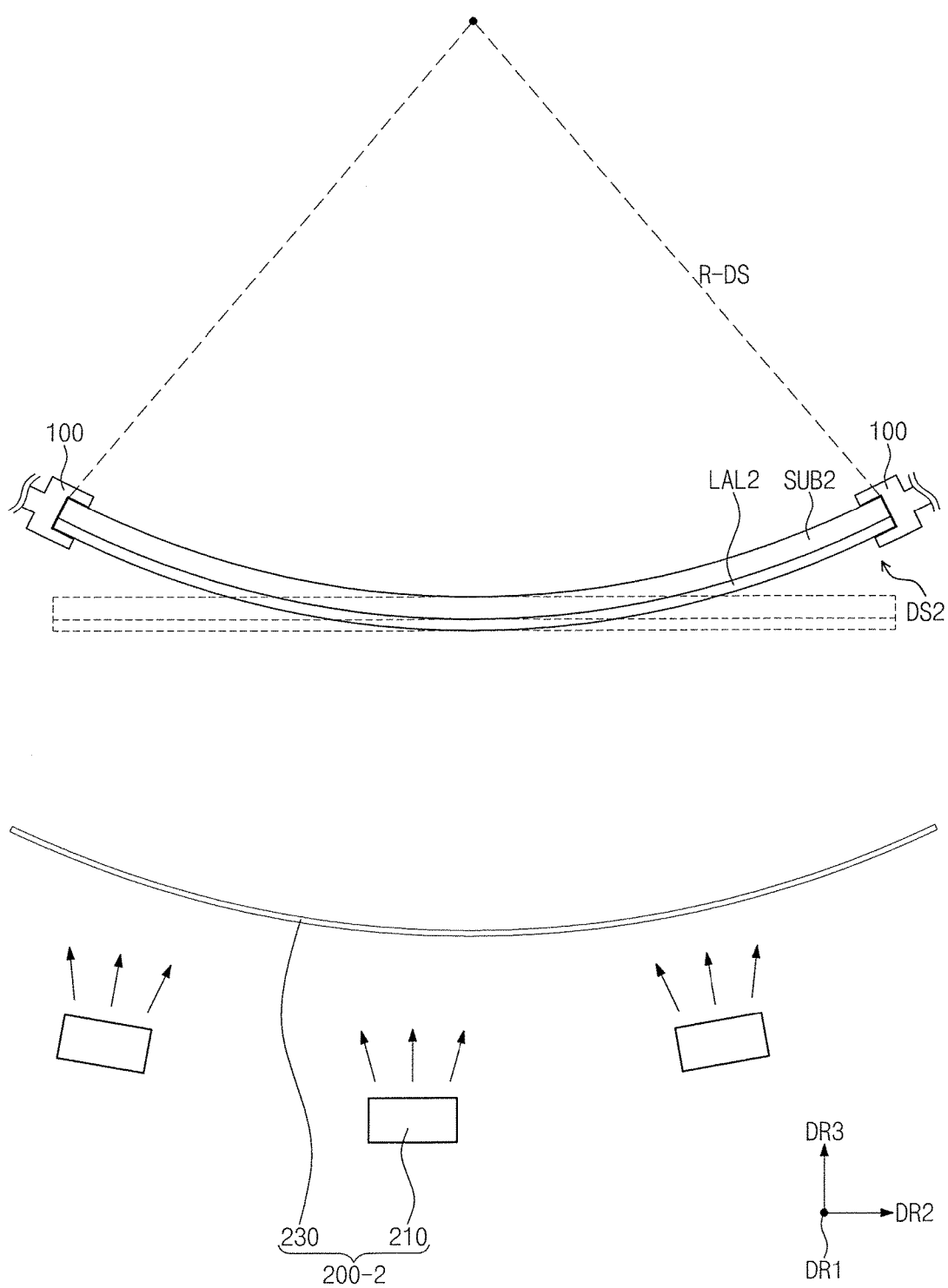
FIG. 14 is a plan view showing a method of forming a second alignment axis according to an exemplary embodiment of the present disclosure.

FIG. 13 is a flowchart showing a method of manufacturing a second display substrate according to an exemplary embodiment of the present disclosure and FIG. 14 is a plan view showing a method of forming a second alignment axis according to an exemplary embodiment of the present disclosure. The second alignment axis may be formed using the same apparatus as shown in FIGS. 11 and 12.

Referring to FIG. 13, the color filter CF and the black matrix BM are formed on the second base substrate SUB2 (S20-1). At least one of the color filter CF and the black matrix BM may be omitted. The color filter CF and the black matrix BM are formed by a coating method, e.g., a slit coating method, a spin coating method, etc., or an inkjet printing method. An organic layer may be further formed on the color filter CF and the black matrix BM to planarize the upper surface of the color filter CF and the black matrix BM.

The second alignment layer LAL2 is formed on the second base substrate SUB2 (S20-2). The second alignment layer LAL2 is formed on the color filter CF and the black matrix BM using a coating method, such as a slit coating method, a spin coating method, etc.

Then, the second alignment axis AA2 is formed in the second alignment layer LAL2 (S20-3). The second alignment axis AA2 is formed by the light irradiation process or the rubbing process. The second alignment axis AA2 may be formed by the apparatus shown in FIGS. 11 and 12.

Hereinafter, the method of forming the second alignment axis AA2 will be described with reference to FIG. 14.

Referring to FIG. 14, an alignment axis forming part 200-2 includes three light emitting devices 210 and a polarizer. In FIG. 14, other elements of the second display substrate DS2 except for the second alignment layer LAL2 and the second base substrate SUB2 are omitted.

The second display substrate DS2 is bent by the jig 100 at a predetermined curvature. The curvature of the second display substrate DS2 is substantially the same as the curvature of the first display substrate DS1 shown in FIG. 11. The jig 100 applies tensile stress to the second alignment layer LAL2. The outer surface of the second base substrate SUB2 has a radius of curvature smaller than that of the inner surface of the second base substrate SUB2. Here, the outer surface corresponds to the surface of the second base substrate SUB2, on which the second alignment layer LAL2 is not disposed.

The alignment axis forming part 200-2 is disposed to face the inner surface of the second base substrate SUB2. Here, the inner surface corresponds to the surface of the second base substrate SUB2, on which the second alignment layer LAL2 is disposed. The alignment axis forming part 200-2 supplies the polarized light to irradiate the second alignment layer LAL2. The second alignment axis AA2 is formed in the second alignment layer LAL2. The second alignment axis AA2 extends in the first direction DR1, which is similar to the transmission axis of the polarizer 230 and the first alignment axis AA1.

As described above, since the second alignment axis AA2 is formed while the second display substrate DS2 is bent, the second alignment axis AA2 may be substantially parallel to the first transmission axis PA1 of the first polarizer Pol1 even though the second display substrate DS2 is coupled to the frame while being bent.

Meanwhile, the alignment axis forming part 200-2 may be disposed to face the outer surface of the second display substrate DS2. The polarized light is provided to the second alignment layer LAL2 through the transmission area TA (refer to FIG. 3) of the second display substrate DS2.

Figure 15:
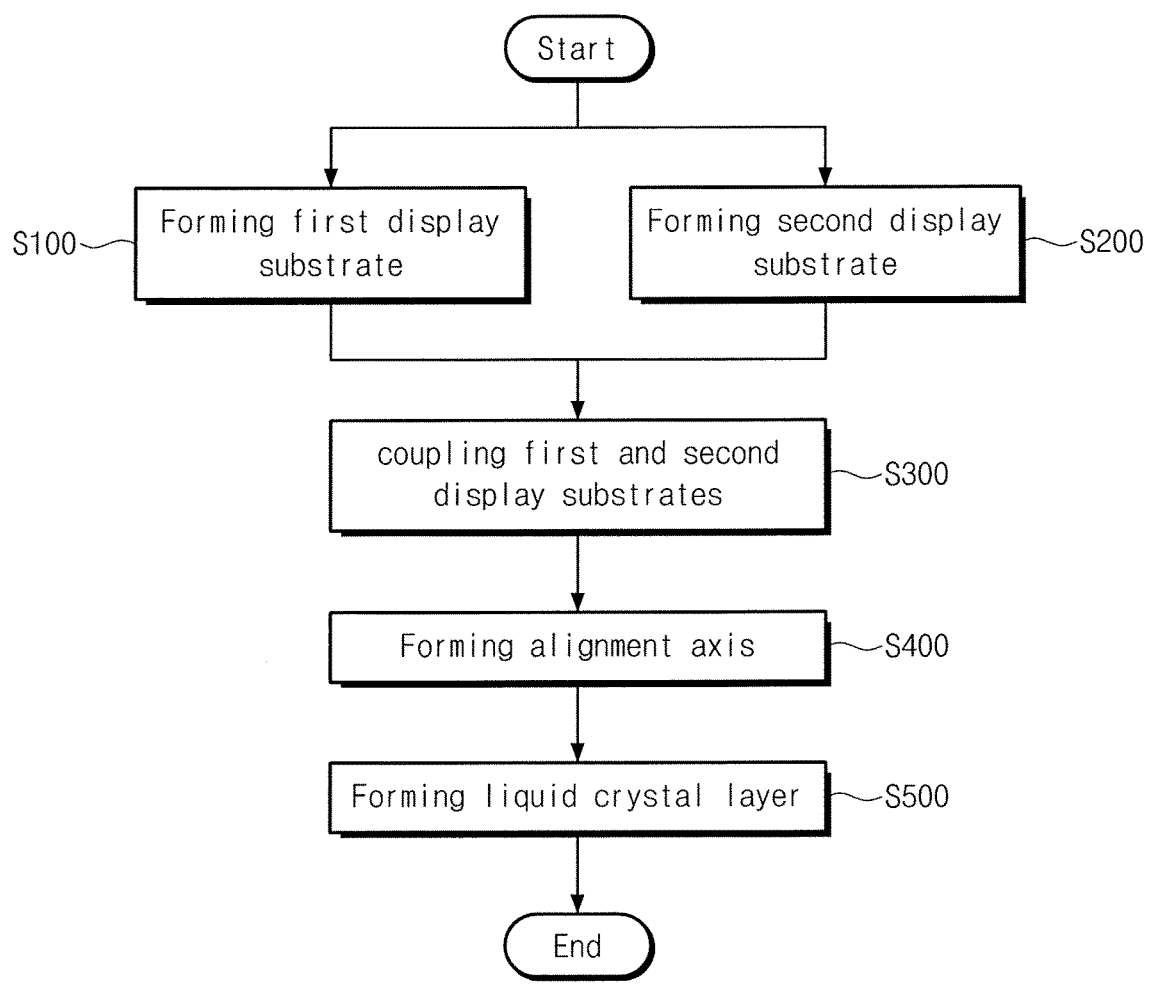
FIG. 15 is a flowchart showing a method of manufacturing a curved liquid crystal display panel according to an exemplary embodiment of the present disclosure.
Figure 16:
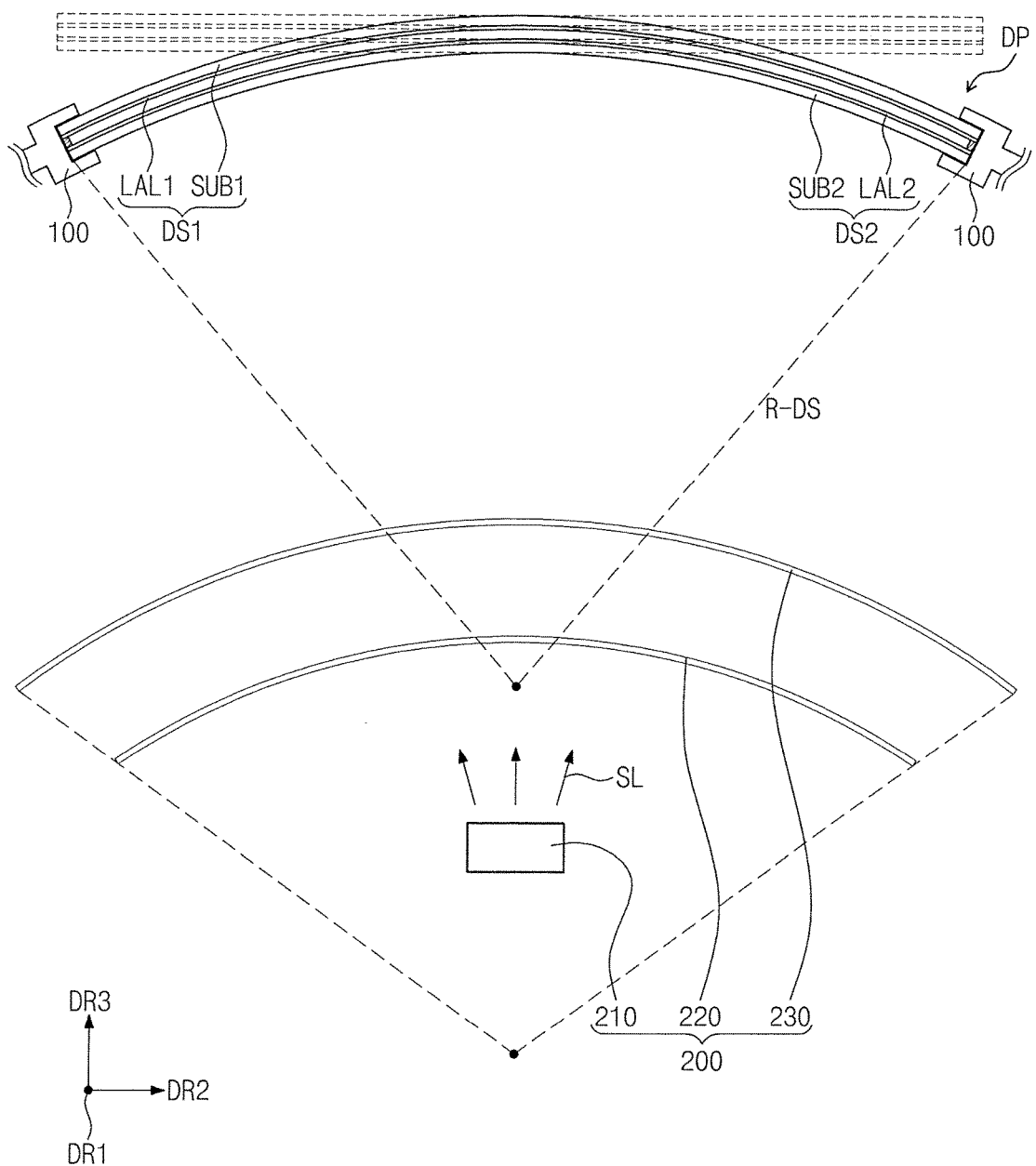
FIG. 16 is a plan view showing a method of forming an alignment axis according to an exemplary embodiment of the present disclosure.
Figure 17:
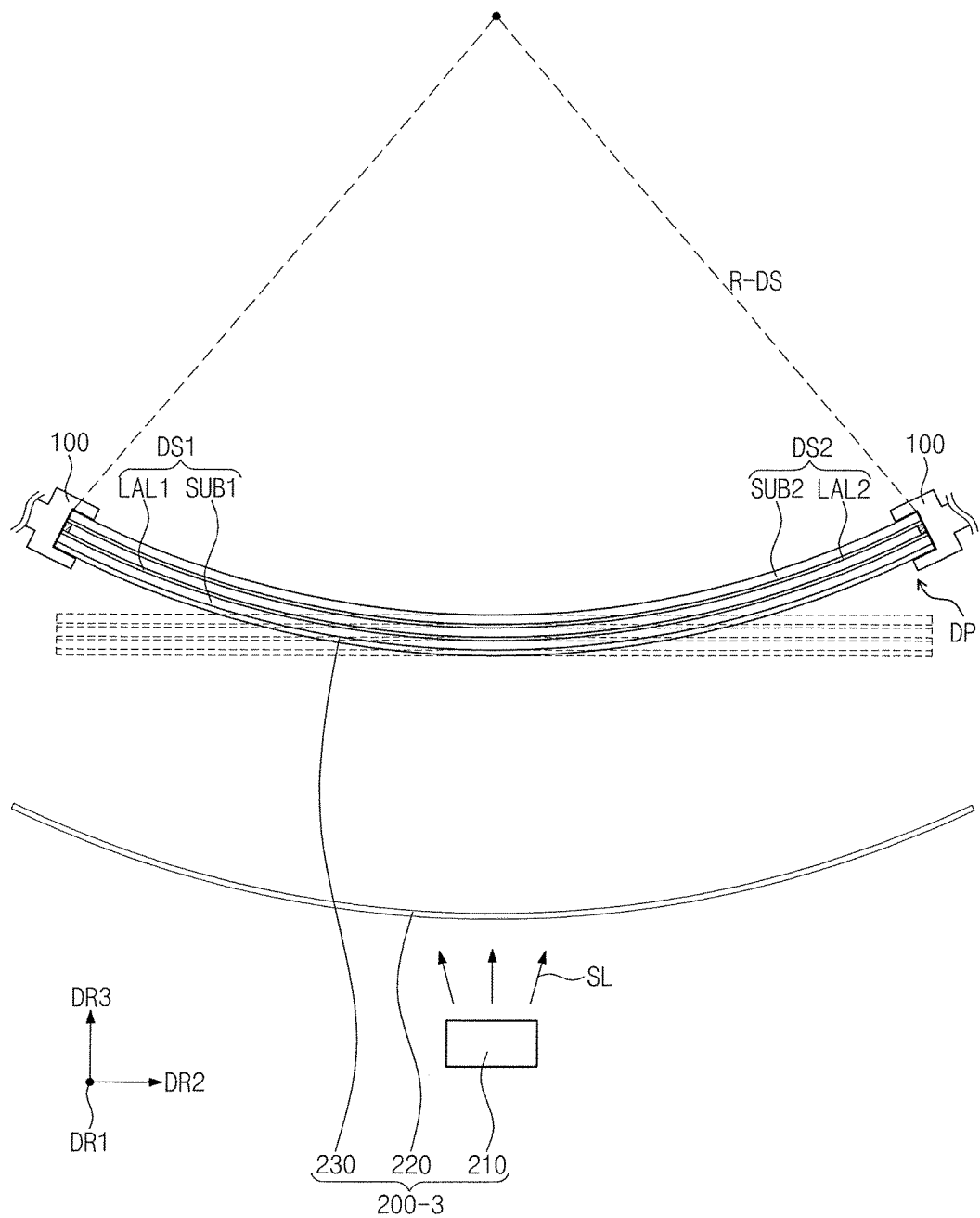
FIG. 17 is a plan view showing a method of forming an alignment axis according to an exemplary embodiment of the present disclosure.

FIG. 15 is a flowchart showing a method of manufacturing a curved liquid crystal display panel according to an exemplary embodiment of the present disclosure, FIG. 16 is a plan view showing a method of forming an alignment axis according to an exemplary embodiment of the present disclosure, and FIG. 17 is a plan view showing a method of forming an alignment axis according to an exemplary embodiment of the present disclosure. Hereinafter, a manufacturing method of the curved liquid crystal display panel will be described in detail with reference to FIGS. 15 to 17. In FIGS. 15 to 17, the same reference numerals may denote the same elements in FIGS. 1 to 14, and thus detailed descriptions of the same elements may be omitted.

Referring to FIG. 15, a first display substrate DS1 is manufactured (S100). The first display substrate DS1 is manufactured by forming signal lines, pixels, and insulating lines on a first base substrate SUB1 and forming a first alignment layer LAL1 of the first base substrate SUB1. The first alignment layer LAL1 is a base layer on which the alignment axis is not defined.

The second display substrate DS2 is manufactured (S200). The second display substrate DS2 is manufactured by forming a color filter and a black matrix on a second base substrate SUB2 and forming a second alignment layer LAL2 on the second base substrate SUB2. The second alignment layer LAL2 is a base layer on which the alignment layer is not defined. The second display substrate DS2 is manufactured at substantially the same time as the first display substrate DS1, or the second display substrate DS2 may be separately manufactured from the first display substrate DS1. The manufacturing order of the first and second display substrates DS1 and DS2 should not be limited to the specific order described herein.

In a manner that is different than the manufacturing method described above with reference to FIGS. 8 to 14, the first alignment axis AA1 of the first alignment layer LAL1 and the second alignment axis AA2 of the second alignment layer LAL2 need not be formed when the first and second display substrates DS1 and DS2 are manufactured. According to an exemplary embodiment of the present invention, the first and second alignment axes AA1 and AA2 may be formed after the first and second display substrates DS1 and DS2 are coupled to each other.

Then, the first display substrate DS1 and the second display substrate DS2 are coupled to each other (S300). The edge of the first and second display substrates DS1 and DS2 may be sealed when the first and second display substrates DS1 and DS2 are coupled to each other.

The first alignment axis AA1 and the second alignment axis AA2 are formed (S400). The first and second alignment axes AA1 and AA2 may be formed substantially simultaneously, for example, using the apparatus ACD shown in FIGS. 10 and 11.

Referring to FIG. 16, the first and second display substrates DS1 and DS2, coupled to each other, are provided. The first and second display substrates DS1 and DS2, coupled to each other, are bent at a predetermined curvature by the jig 100. The second display substrate DS2 is bent to have a radius of curvature, to which a cell gap is reflected, smaller than that of the first display substrate DS1.

The alignment axis forming part 200 is disposed to face the second display substrate DS2. The alignment axis forming part 200 projects the polarized light to irradiate the first and second alignment layers LAL1 and LAL2. The first and second alignment axes AA1 and AA2 are respectively formed in the first and second alignment layers LAL1 and LAL2. The first and second alignment axes AA1 and AA2 extend in the first direction DR1 as the transmission axis of the polarizer 230.

According to some exemplary embodiments of the present invention, the polarizer 230 has a transmission axis that extends in the second direction DR2, and thus the direction of the first and second alignment axes AA1 and AA2 may be changed. In addition, the alignment axis forming part 200 may be disposed to face the first display substrate DS1. The polarizer 230, the diffusion member 220, and the light emitting device 210 may be sequentially arranged in the third direction DR3 from the first display substrate DS1.

Referring to FIG. 17, a polarizer 230 of an alignment axis forming part 200-3 may be disposed on the outer surface of the first display substrate DS1. The polarizer 230 is bent by the jig 100 at the same curvature as that of the first display substrate DS1. After the first and second alignment axes AA1 and AA2 are formed, the polarizer 230 may be used as a part of the curved liquid crystal display panel. For example, the polarizer 230 may serve as the first polarizer Pol1 shown in FIG. 2 without being separated from the first display substrate DS1.

Although not shown in figures, the first and second alignment axes AA1 and AA2 may be formed after the second polarizer Pol2 is further disposed on the outer surface of the second display substrate DS2.

Referring to FIG. 15 again, when the first and second alignment axes AA1 and AA2 are formed, the liquid crystal layer is formed between the first and second display substrates DS1 and DS2 (S500). The liquid crystal layer is formed by injecting the liquid crystal composition into between the first and second display substrates DS1 and DS2.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a curved liquid crystal display panel, comprising:
    bending a first display substrate, including a first alignment layer, at a predetermined curvature; and
    rubbing or irradiating the alignment layer to establish a first alignment axis in the first alignment layer while the first display substrate remains bent at the predetermined curvature.

2. The method of claim 1, wherein the first alignment layer comprises a photo-reactive polymer and the establishing of the first alignment axis comprises irradiating the photo-reactive polymer of the first alignment layer using light polarized in a predetermined direction, while the first display substrate remains bent at the predetermined curvature.

3. A method of manufacturing a curved liquid crystal display panel, comprising:
    bending a first display substrate, including a first alignment layer, at a predetermined curvature; and
    forming a first alignment axis in the first alignment layer while the first display substrate remains bent at the predetermined curvature, wherein the first alignment layer comprises a polymer in which an energy between a liquid crystal director and a surface of the first alignment layer is larger than an energy between the liquid crystal director and air, and the forming of the first alignment axis comprises rubbing the first alignment layer in a predetermined direction.

4. The method of claim 1, wherein the first display substrate comprises a plurality of pixels and each of the plurality of pixels comprises a pixel electrode and a common electrode, wherein a fringe electric field or a horizontal electric field is formed by the pixel electrode and the common electrode.

5. The method of claim 1, further comprising:
bending a second display substrate, including a second alignment layer, at the predetermined curvature; and
forming a second alignment axis, the second alignment axis is substantially parallel to the first alignment axis, in the second alignment layer while the second display substrate remains bent at the predetermined curvature.

6. The method of claim 5, wherein the second alignment layer comprises a same material as the first alignment layer and the second alignment axis is formed through a same process as the first alignment axis.

7. The method of claim 5, further comprising coupling the first display substrate and the second display substrate to each other such that the first alignment layer faces the second alignment layer.

8. The method of claim 7, further comprising disposing a liquid crystal composition on one of the first and second alignment layers before the coupling of the first display substrate and the second display substrate.

9. The method of claim 7, further comprising injecting a liquid crystal composition in between the first and second alignment layers after the coupling of the first display substrate and the second display substrate.

10. A method of manufacturing a curved liquid crystal display panel, comprising:
bending a display panel at a predetermined curvature, the display panel comprising a first display substrate having a first alignment layer and a second display substrate having a second alignment layer that is spaced apart from the first display substrate; and
irradiating the display panel with light polarized in a predetermined direction to form a first alignment axis in the first alignment layer and a second alignment axis in the second alignment layer while the display panel remains bent at the predetermined curvature.

11. The method of claim 10, wherein the first and second alignment layers each comprise a photo-reactive polymer.

12. The method of claim 10, wherein the first display substrate comprises a plurality of pixels and each of the plurality of pixels comprises a pixel electrode and a common electrode, wherein a fringe electric field or a horizontal electric field is formed by the pixel electrode and the common electrode.

13. The method of claim 12, wherein the second display substrate comprises a plurality of color filters corresponding to the plurality of pixels.

14. The method of claim 13, wherein the first display substrate is irradiated by the polarized light during the irradiating of the display panel.

15. The method of claim 13, wherein the first display substrate further comprises a polarizer to convert light incident thereto to the polarized light.

16. The method of claim 10, further comprising forming a liquid crystal layer between the first alignment layer and the second alignment layer.

17. The method of claim 1, further comprising:
releasing the first display substrate to a flat position after the first alignment axis has been established;
bonding the first display substrate to a second display substrate while the first display substrate is in the flat position; and
re-bending the bonded first display substrate to the predetermined curvature after bonding has been performed.

* * * * *